United States Patent [19]

Williamson

[11] Patent Number: 4,630,505
[45] Date of Patent: Dec. 23, 1986

[54] HYDRAULIC-CONTROLLED DIFFERENTIAL

[76] Inventor: Archie O. Williamson, 5916 S. Halifax Ave., Edina, Minn. 55424

[21] Appl. No.: 791,101

[22] Filed: Oct. 24, 1985

[51] Int. Cl.$^4$ .............................................. F16H 1/44
[52] U.S. Cl. .......................................... 74/711; 74/714
[58] Field of Search ..................... 74/710.5, 711, 714

[56] References Cited

U.S. PATENT DOCUMENTS

| | | | |
|---|---|---|---|
| 1,113,305 | 10/1914 | Brown | 74/713 |
| 1,235,249 | 7/1917 | Salfisberg | 74/713 |
| 1,239,990 | 9/1917 | Ware | 74/713 |
| 1,886,668 | 11/1932 | Gabli | 74/710 |
| 2,532,757 | 12/1950 | Butterworth | 74/710.5 |
| 2,655,055 | 10/1953 | Bottcher | 74/711 |
| 2,671,358 | 3/1954 | Johnston | 74/711 |
| 3,040,600 | 6/1962 | Mueller | 74/711 |
| 3,232,139 | 2/1966 | Nickell | 74/711 |
| 3,385,133 | 5/1968 | Terao | 74/710 |
| 3,831,461 | 8/1974 | Mueller | 74/711 |
| 4,224,839 | 9/1980 | von Kaler | 74/701 |
| 4,272,993 | 6/1981 | Kopich | 74/711 |

FOREIGN PATENT DOCUMENTS 721707 11/1966 Italy ................................. 74/710.5

OTHER PUBLICATIONS

Motors Auto Repair Manual, 1973, unnumbered page.
The Way Things Work, 1967, p. 501.
Van Nostrand's Scientific Encyclopedia, 1976, 2 unnumbered pages.
Mark's Mechanical Engineers Handbook, 1958, 8-10-3-8-104, 11-12.
Popular Science, Feb. 1984, pp. 58-61.
Motor Trend, Jun. 1985, p. 151.

Primary Examiner—Lawrence Staab
Assistant Examiner—Martin G. Belisario
Attorney, Agent, or Firm—Merchant, Gould, Smith, Edell, Welter & Schmidt

[57] ABSTRACT

A hydraulic-controlled differential (10) includes a case (12) defining a central chamber with intermeshed control gear (52-58) different ones of which are drivingly-connected via shaft and gear arrangements (60-66, 88, 90, 94, 98 and 102) through side chambers to opposite output shafts (86). The central and opposite side chambers of the case (12) are interconnected for fluid communication via control valves (113) for controlling flow of hydraulic fluid between the chambers to effect hydraulic modulation during differential drive for more controllability. A second embodiment (150) for lighter-duty applications incorporates two control gears (152, 154).

12 Claims, 12 Drawing Figures

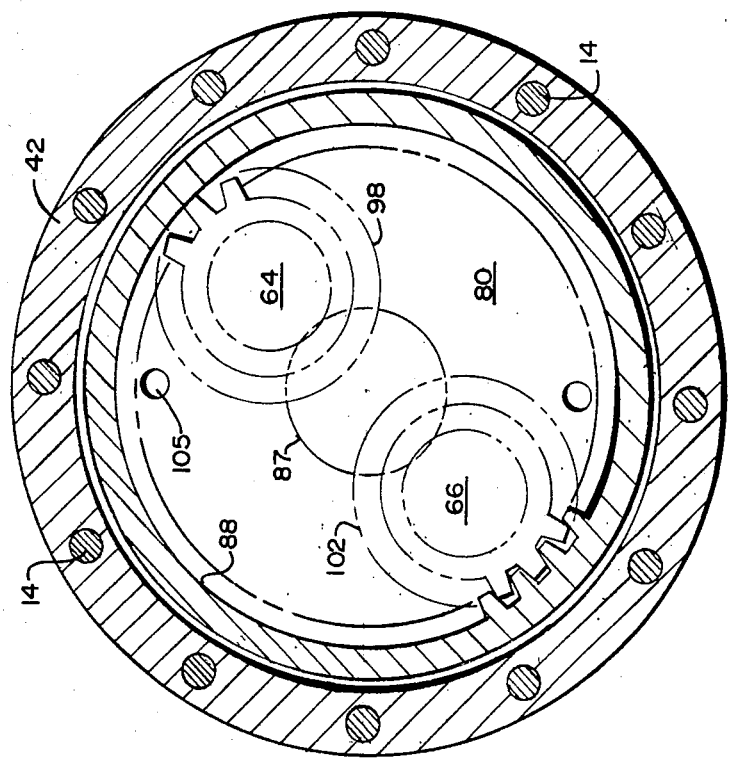
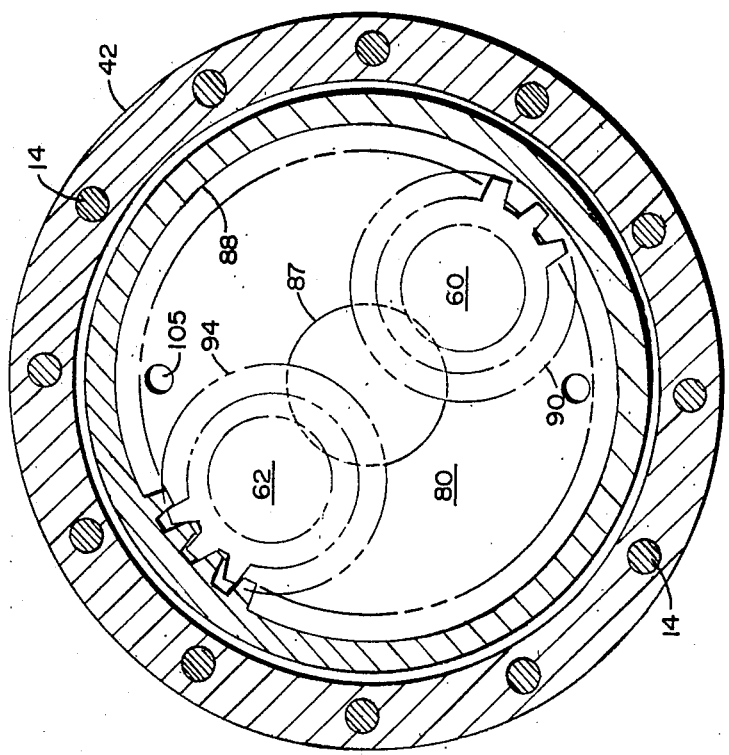

HYDRAULIC-CONTROLLED DIFFERENTIAL

TECHNICAL FIELD

The present invention relates generally to drive trains. More particularly, this invention concerns an improved hydraulic-controlled differential for positively applying power from a drive shaft to a pair of driven shafts while limiting maximum differentiation between the driven shafts for better safety and control.

BACKGROUND ART

During maneuvering, it may be necessary for the wheels on opposite sides of a vehicle to rotate at different rates or even in opposite directions. For example, as a four-wheel vehicle rounds a curve, the outer wheels travel a greater distance and therefore must turn faster than the inner wheels. Maneuvering in tight quarters can cause opposing wheels to turn in opposite directions. This presents no difficulties if the wheels are either driven independently or mounted on a dead axle for independent rotation, however, with a live axle some compensation is necessary to permit the wheels to turn at different speeds.

Differentials or differential gearing have long been utilized for distributing power between the wheels while permitting one wheel to turn faster than the other, as needed on curves. The differentials of the prior art typically include a ring gear driven by a pinion gear mounted on the drive shaft. The ring gear is secured to a differential case or housing for rotation therewith. Each axle includes a coaxial bevel gear which meshes at right angles with pinions mounted on spindles within the differential case. When traveling straight ahead, the differential case is simply driven by the ring gear, and there is no relative motion between the pinion and bevel gears therein. When rounding a curve, however, one wheel must travel relatively faster, and the differential rotation of the axles is compensated for by the pinion gears which permit opposite relative rotation of the bevel gears as the pinion gears are being driven by the differential case, such that faster rotation of one axle and wheel is offset by proportionately slower rotation of the other axle and corresponding wheel.

One of the main disadvantages of conventional differentials has been that all power can be applied to one wheel to the exclusion of the other. That is, if one wheel slips on ice or mud while the other wheel is resting on dry pavement, the differential case and pinion gears therein simply turn around the stationary bevel gear of the axle of the wheel with traction on dry pavement, while the bevel gear for the axle of the wheel without traction simply turns with the pinion gears inside the rotating case about the bevel gear for the other axle.

Another disadvantage of the prior differentials has been that there is no provision for controlling the maximum amount of differentiation between opposite axles. This is usually unnecessary when the vehicle is under control and is being operated within design conditions, however, it can be a significant consideration if the vehicle should spin. In a spin, like those experienced when a driver loses control of his vehicle, such as during auto racing, the wheels on opposite sides of the vehicle tend to rotate in opposite directions, which further contributes to the lack of controllability of the vehicle. It would be far preferable to be able to limit the maximum amount of differentiation between the axles. so that, in the event of a spin, the differential would drag, causing the vehicle to slide in a more predictable, controllable and safe manner.

Various positive or so-called non-slip differentials have been available heretofore, however, the prior differentials have been unnecessarily complex and expensive. One of the most popular non-slip differentials of the prior art operates only in forward gear but not in reverse. Moreover, the prior non-slip differentials only limit slip between the drive shaft and the axles, but not between the axles.

A need has thus arisen for an improved positive differential which effects differentiation between a drive shaft and two driven axles so that neither axle can be driven to the exclusion of the other, but which also limits the maximum amount of differentiation between the axles so that they will not turn uncontrollably in opposite directions should the vehicle spin.

SUMMARY OF THE INVENTION

The present invention comprises an improved differential which overcomes the foregoing and other difficulties associated with the prior art. In accordance with the invention, there is provided a hydraulic-controlled differential including a case defining three chambers: a central chamber and two side chambers, one side chamber for each of the two driven axles. At least one pair of control gears, which are in meshed engagement for rotation in opposite directions, are provided in the central chamber. The control gears and adjacent walls of the central chamber define a gear pump. One of the control gears is connected to a drive gear in one side chamber, while the other control gear is connected to another drive gear in the other side chamber. The drive gears are respectively engaged with internal driven gears secured to the opposite axles. Hydraulic fluid is provided in the chambers, which are connected in fluid communication by spring-biased control valves. Differential drive of the axles is accomplished primarily by the control gears, drive gears, and driven gears. However, the control gears also function to positively displace hydraulic fluid between the chambers in response to differential drive. The control valves effect hydraulic modulation to limit the maximum rate of fluid transfer so that uncontrolled differentiation cannot occur. Two embodiments are disclosed herein.

BREIF DESCRIPTION OF THE DRAWINGS

A better understanding of the invention can be had by reference to the following Detailed Description in conjunction with the accompanying Drawings, wherein.

Figure 1:
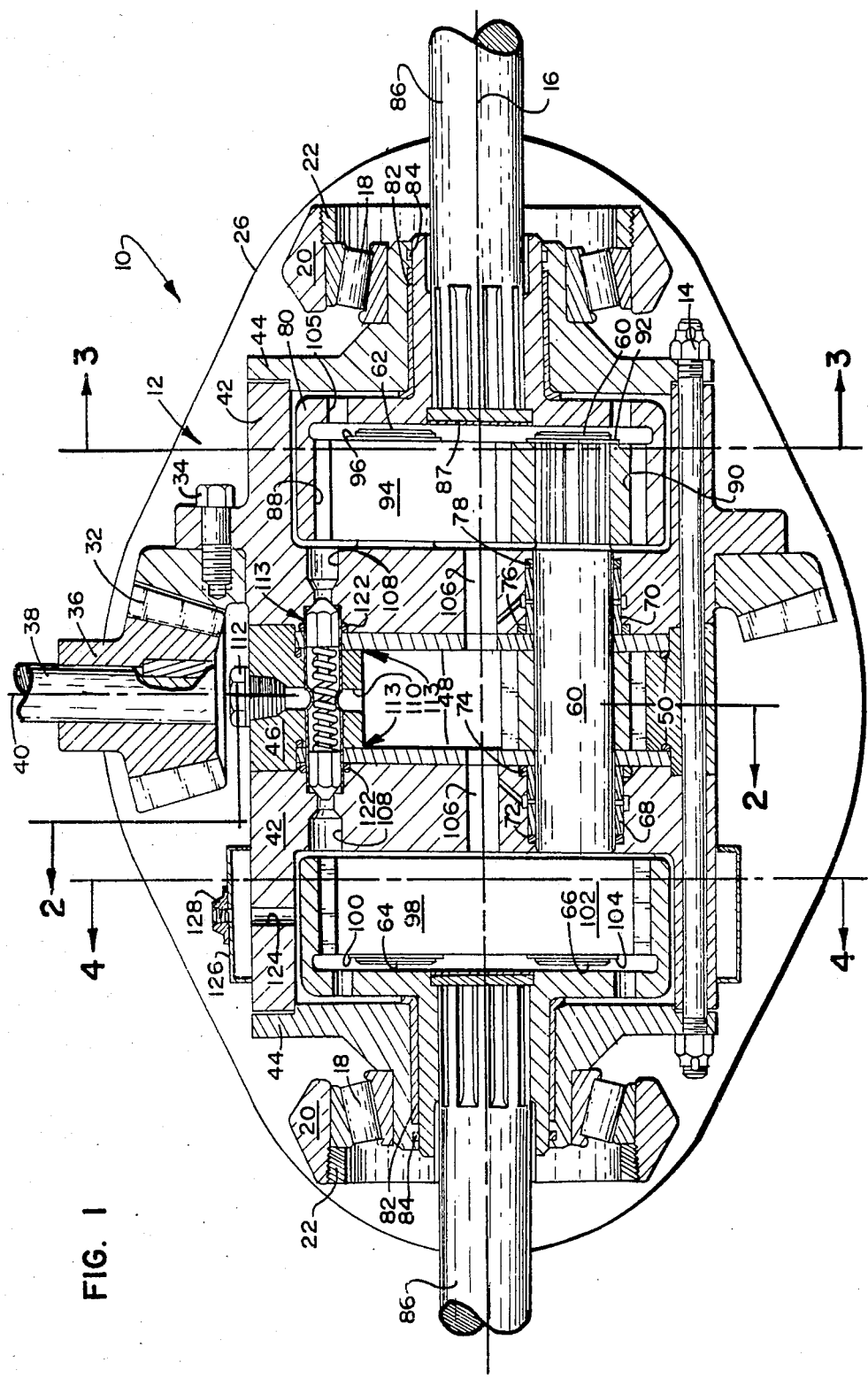
FIG. 1 is a sectional view of the differential incorporating a first embodiment of the invention.
Figure 5A:
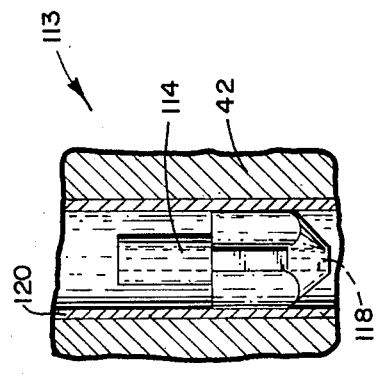
Figure 5B:
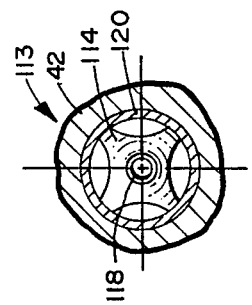
Figure 5C:
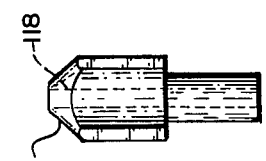
Figure 6:
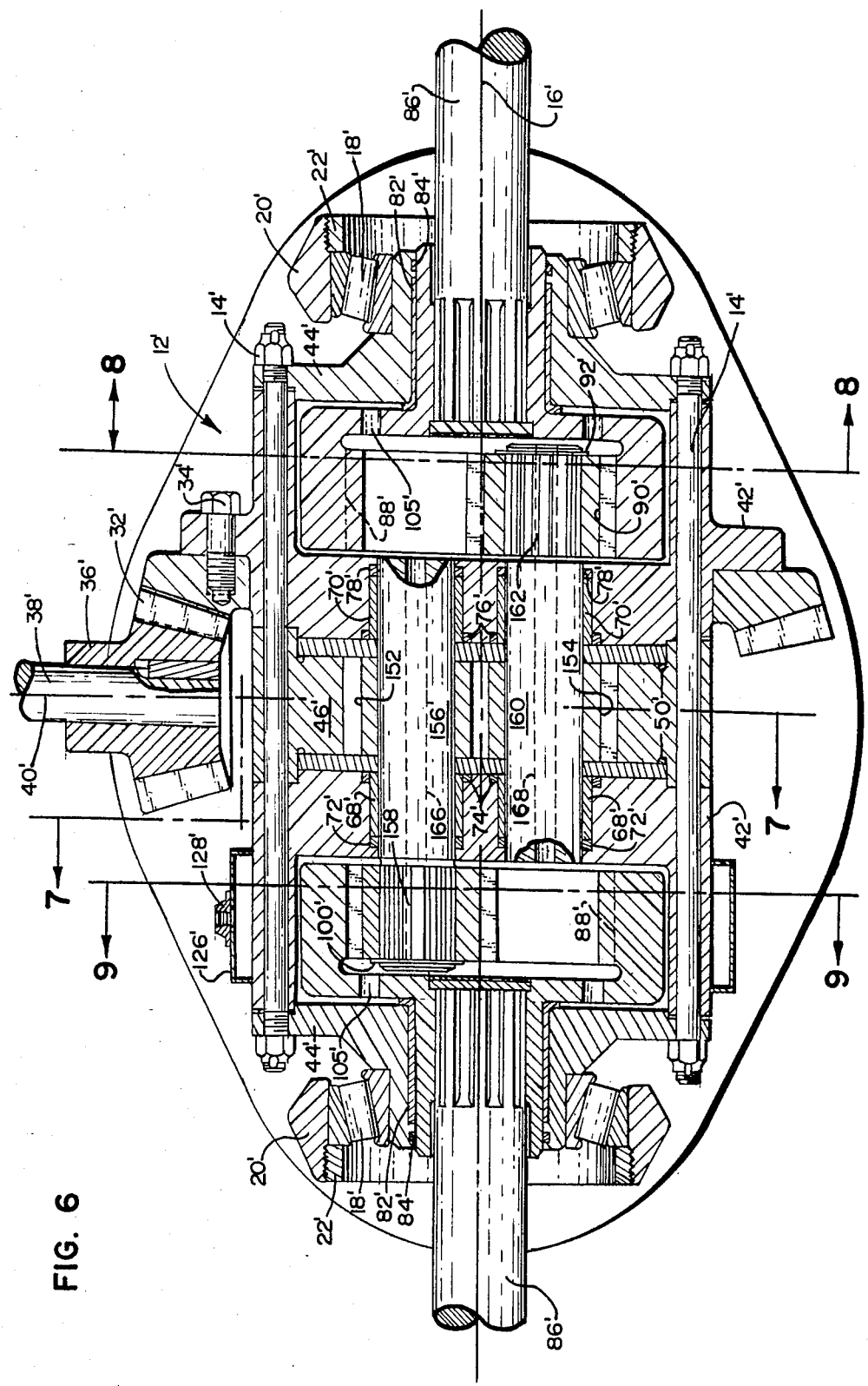
Figure 7:
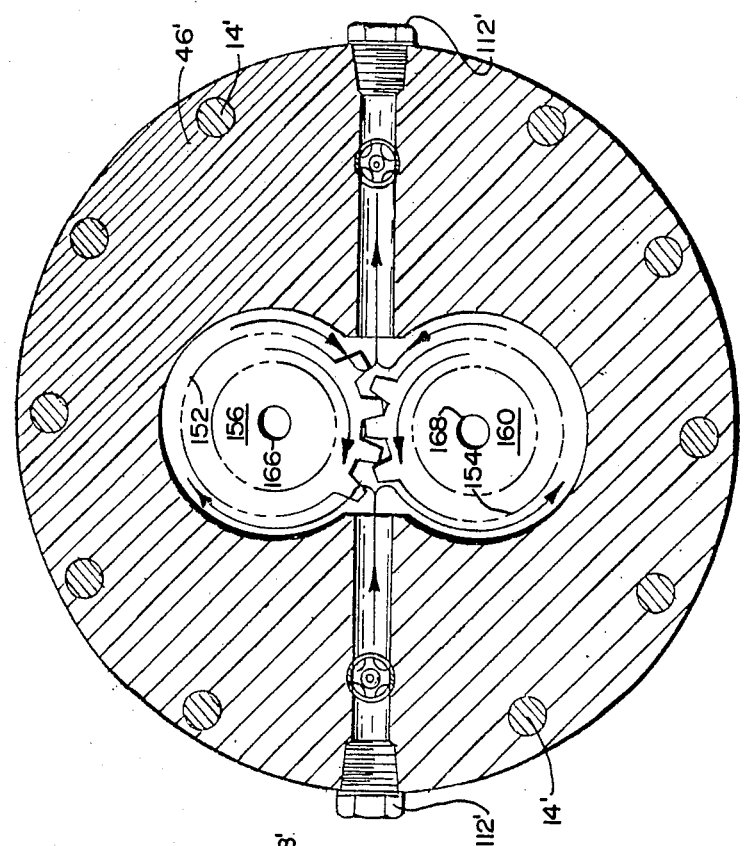
Figure 10:
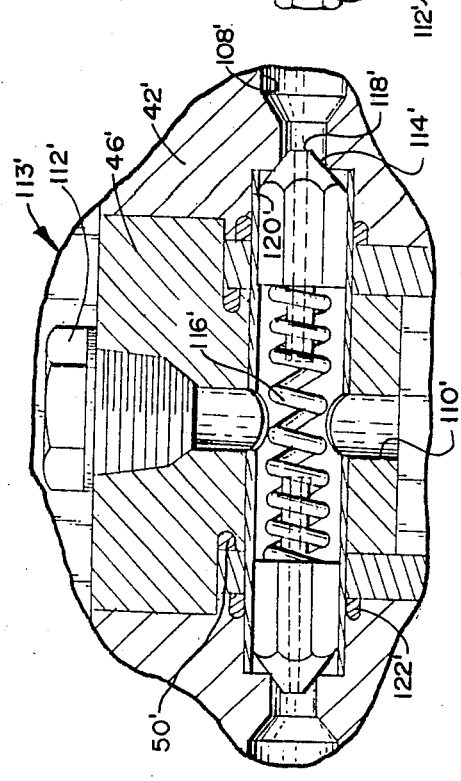
Figure 8:
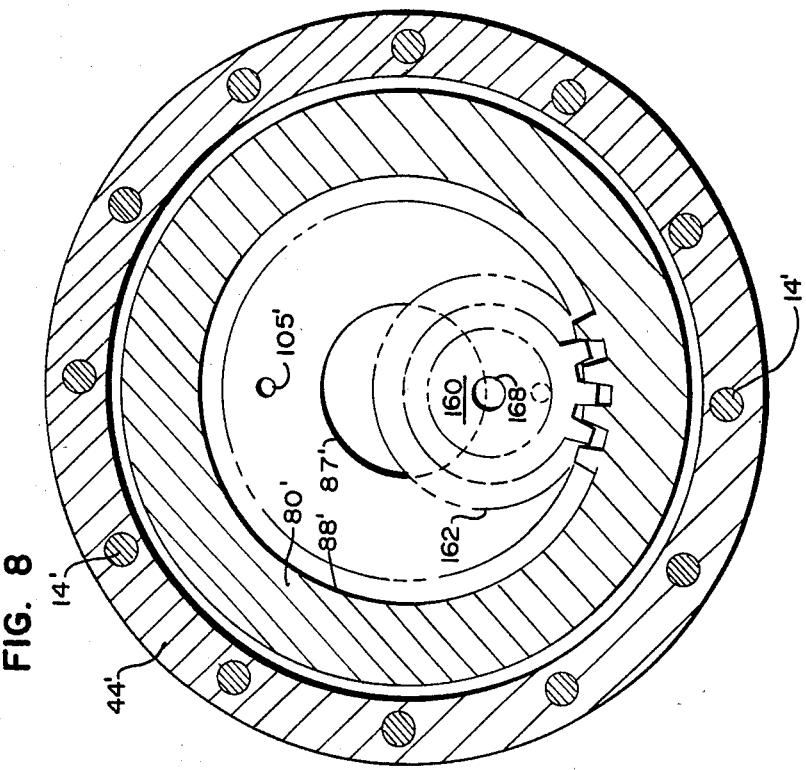
Figure 9:
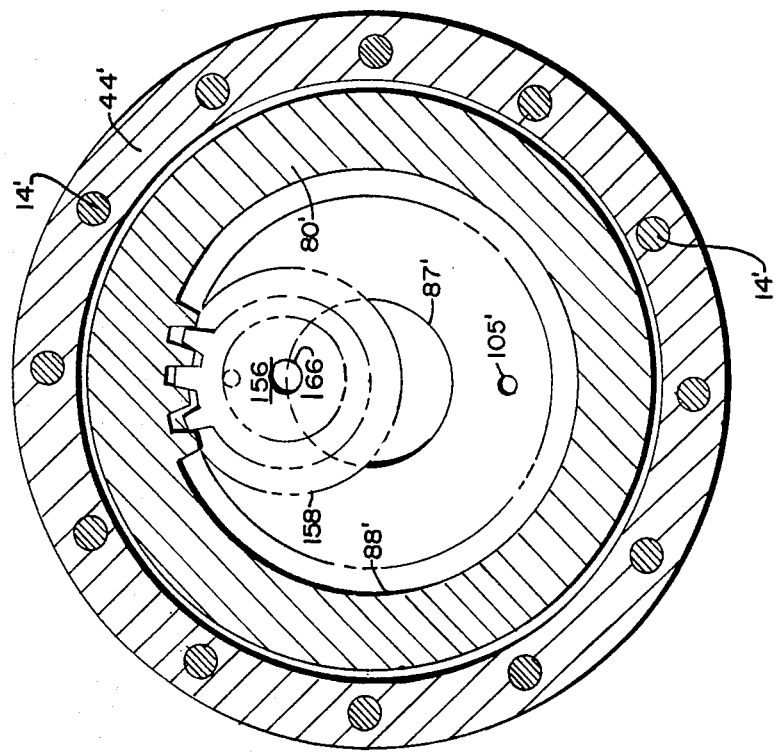

FIGS. 3 and 4 are enlarged sectional views taken along lines 3—3 and 4—4, respectively, of FIG. 1 in the direction of the arrows;

FIGS. 5a, 5b and 5c are enlarged illustrations of the control valve;

FIG. 6 is a sectional view of the differential incorporating a second embodiment of the invention;

FIG. 7 is an enlarged sectional view taken along lines 7—7 of FIG. 6 in the direction of the arrows;

FIGS. 8 and 9 are enlarged sectional views taken along lines 8—8 and 9—9, respectively, of FIG. 7 in the direction of the arrows; and FIG. 10 is an enlarged illustration of the control valve.

DETAILED DESCRIPTION

Referring now to the Drawings wherein like reference numerals designate like or corresponding elements throughout the views, and particularly referring to FIG. 1, there is shown a hydraulic-controlled differential 10 incorporating a first embodiment of the invention. As will be explained more fully hereinafter, the differential 10 utilizes a gear arrangement for dividing power between the axles and compensating for differential rotation therebetween, together with a hydraulic flow control arrangement to control the maximum differentiation between the axles and thus improve controllability and safety.

The differential 10 includes a case 12 which is of split, symmetrical construction interconnected by a surrounding circle of transversely extending bolts 14. The case 12 is supported for rotation about a generally transverse axis 16 between a pair of bearings 18 which in turn are mounted in a pair of corresponding arms 20 of a bearing carrier (not shown). Retaining rings 22 secure bearings 18 and the differential case 12 in place between the bearing carrier arms 20. The bearing carrier and case 12 are enclosed by a housing 26 which has been shown schematically for purposes of clarity.

Means are provided for driving the differential case 12. As illustrated, a circular crown or ring gear 32 surrounds case 12 and is secured thereto for rotation by means of suitable fasteners, such as bolts 34, only one of which is shown. A pinion gear 36, which is secured to the end of an input shaft 38, such as by means of a key and keyway as shown, is meshed with the ring gear 32 for driving the case 12 about axis 16. The input shaft 38 in turn is driven by an engine or motor via a transmission (not shown). Case 12 can also be driven by other means, such as by a chain-and-sprocket arrangement, belt-and-pulley arrangement, spur gears, or the like. The particular manner in which case 12 is driven is not critical to practice of the invention.

The case 12 includes a pair of side sections 42 and a pair of end sections 44. An intermediate section 46 is provided between the side sections 42. Bolts 14, which are preferably located at even circumferentially spaced-apart intervals, interconnect the sections 42, 44 and 46 of the case 12 as shown.

The side sections 42 and the intermediate section 46 of case 12 define a central chamber. A pair of bushing plates 48 and seals 50 are provided between the intermediate section 46 and the side sections 42 for purposes of further defining a fluid-tight central chamber therebetween.

Figure 2:
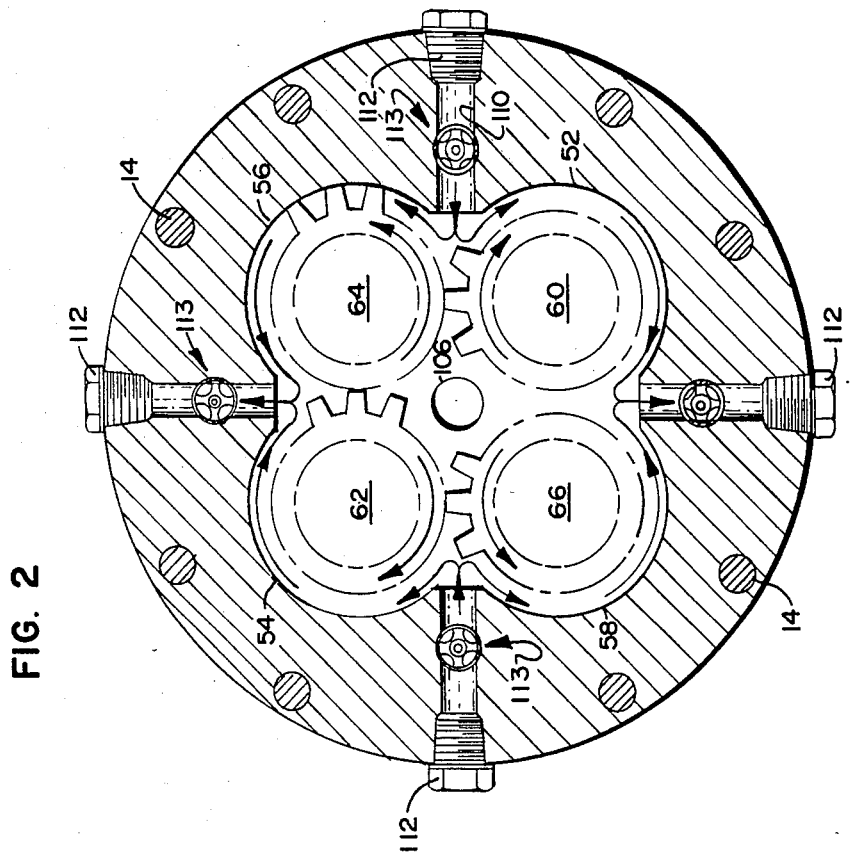
FIG. 2 is an enlarged sectional view taken along lines 2—2 of FIG. 1 in the direction of the arrows.

Referring to FIGS. 1 and 2, the central chamber of case 12 includes four control gears 52, 54, 56 and 58 arranged in generally rectangular relationship. Each control gear is in direct meshed engagement with the adjacent two gears so that each diagonal pair of gears rotates in the same direction but opposite to that of the other diagonal pair of gears. The gears 52, 54, 56 and 58 are secured to shafts 60, 62, 64 and 66, respectively. Each of the shafts 60, 62, 64 and 66 is in turn rotatably supported between the side sections 42 of case 12. For example, bushings 68 and 70 and seals 72, 74, 76 and 78 are provided between the side members 42 and shaft 60. Similar arrangements of bushings and seals are provided between the side member 42 and each of the other shafts 62, 64 and 66. It will thus be appreciated that the control gears 52, 54, 56 and 58 are individually secured to shafts 60, 62, 64 and 66, which are supported for rotation between the side members 42 of case 12, which is rotatable between the carrier arms 20.

The control gears 52, 54, 56 and 58, together with the adjacent walls of the central chamber of case 12, function as a gear pump.

Referring to FIG. 1 in conjunction with FIGS. 3 and 4, the side sections 42 and end sections 44 define a pair of side chambers located at opposite ends of the case 12. A rotatable cup-like member 80 extends into each side chamber. Each member 80 includes an inside end within the side chamber and an outside end extending out from that chamber. In particular, each member 80 includes a reduced outside end which is journalled for rotation within the associated end section 44 of the case 12. A bushing 82 and seal 84 are provided between the reduced end of each member 80 and the associated end section 44, which is connected to an output shaft 86. As illustrated, the output shafts 86 and members 80 are secured together by splines, however, any suitable type of interconnection can be utilized. The ends of members 80, which would typically be formed by machining, are closed by plugs 87, welded or otherwise suitably secured in place to prevent oil leakage.

The inside ends of members 80 are drivingly connected to the control gears 52, 54, 56 and 58 by a shaft and gear drive arangement. In particular, the inside end of each member 80 defines an internal gear 88. Shafts 60 and 62 extend into the right side chamber shown in FIG. 1. A gear 90 is secured to the outer end of shaft 60 by means of splines and a retaining ring 92. Similarly, a gear 94 is secured to the outer end of shaft 62 by means of a spline connection and a retaining ring 96. The drive gears 92 and 94 are not engaged directly with each other, but are both meshed with the internal gear 88 of the associated member 80 for rotation in the same direction. In similar fashion, the outer ends of the other diagonal pair of shafts 64 and 66 extend into the opposite side chamber. Gear 98 is secured for rotation on the end of shaft 64 by means of splines and a retaining ring 100. Gear 102 is secured for rotation on the end of shaft 66 by means of splines and another retaining ring 104. Gears 98 and 102 are not engaged directly with each other, but are both meshed with the internal gear 88 of the member 80 in the left side chamber of case 12.

Openings 105 are preferably provided in members 80 to facilitate fluid flow within the side chambers.

It will thus be appreciated that the output shafts 86 are positively interconnected with the input shaft 38 by a gear arrangement that effects equal or differential drive in the same direction. Normally, when the vehicle is traveling straight ahead, case 12 rotates carrying control gears 52, 54, 56 and 58 and drive gears 90, 94, 98 and 102 therein without relative rotation between the gears. The advantages of the invention are particularly evident during differential drive.

The central and side chambers within case 12 are interconnected for fluid communication at controlled rates of fluid flow which limit the amount of differentiation between output shafts 86 so that uncontrolled differentiation cannot occur. Each side section 42 and plate 48 includes a central bore defining a passageway 106 extending between the corresponding side chamber and a portion of the central chamber inside control gears 52, 54, 56 and 58 as is best seen in FIGS. 1 and 2. Passageways 106 primarily serve to provide for hydraulic fluid level and pressure equalization between the chambers when there is no differentiation between output shafts 86, but also serve as either supply or return lines between the side chambers and the central chamber during differentiation.

If desired, diagonal holes off passageway 106 can be provided as shown for lubrication of shafts 60, 62, 64 and 66.

In addition to central passageway 106, offset bores 108 are also provided between the central and side chambers. Each corresponding pair of offset bores 108 in sections 42 and bushing plates 48 are joined to a radial cross bore 110 in section 46 that opens onto the central chamber at the outside points of gear intermesh as is best shown in FIG. 2. Four offset bores 108 are thus provided in each side section 42, and four corresponding radial cross bores 110 are provided in the intermediate section 46 of case 12. Closure plugs 112, which are preferably magnetic to pick up any loose metal particles in the hydraulic fluid within case 12, are located in the outside ends of cross bores 110.

Each offset bore 108 includes a control valve 113 comprising a slideable valve member 114 which is normally biased by a compression spring 116 to a closed or "minimum open" position against flow out of the respective side chamber, as shown in FIG. 1. The valve members 114, however, include a central bypass hole 118, as is best seen in FIG. 5, which is sized and dimensioned to permit a predetermined minimum flow rate from the central chamber to the side chambers when the associated pair of control gears rotate in a direction to discharge fluid and thus increase pressure in the corresponding cross bore 110. Since each cross bore 110 is fluidly connected to two control valves 113, and since adjacent control gears rotate in opposite directions, it will be appreciated that two of the cross bores are under pressure while the other two are under suction during differentiation. A bushing 102 and seal 122 are provided between each control valve 113 and the associated side section 42 and bushing plate 49. The exterior of each valve member 114 is preferably fluted as is best seen in FIG. 5, to provide increased flow area when the valve moves to the open or "maximum open" position against spring 116 in response to suction in the associated cross bore 110.

Upon differentiation, it will thus be apparent that hydraulic fluid is supplied and returned via cross bores 110 between the central chamber and the side chambers at different flow rates controlled by valves 113 to provide modulation so that uncontrolled differentiation cannot occur. A relatively larger cross-sectional flow area for suction is desirable to assure that control gears 52, 54, 56 and 58 have an adequate supply of fluid in the central chamber. The ratio between the cross section flow areas of valve 113 in the minimum and maximum open positions can be about 1:5 or higher, perhaps up to 1:10, depending upon how quickly lockup is desired.

The hydraulic differential 10 functions in an advantageous manner when the vehicle is rounding a curve, applying differential drive to the output shafts 86 in a hydraulically controlled and modulated manner as necessary. However, the advantages of the invention are particularly evident when one of the output shafts is experiencing little or no traction, such as under slippery conditions or when the vehicle starts to spin out of control. Free full intake of oil but controlled discharge from the central chamber causes the momemtum lockup of the control gears. Lock-up only releases when pump action stops. Non-slip or limited non-slip differentials have been available heretofore, however, the differential 10 herein also limits differentiation between axles by controlling the flow rate between the central and side chambers within case 12. The control gears 52, 54 56 and 58 within the central chamber operate in effect like a gear pump whose rate of displacement is limited by control valves 113 so as to limit the maximum amount of possible differentiation between the output shafts 86.

A fill opening 124, surrounding cover 126, and removable plug 128 are also provided on case 12 to facilitate filling with hydraulic fluid.

FIGS. 6–10 illustrate a hydraulic-controlled differential 150 incorporating a second embodiment of the invention. The differential 150 incorporates numerous component parts which are substantially identical in construction to corresponding components of the differential 10. Such parts have been identified with the same reference numerals as those utilized in conjunction with the differential 10, but have been differentiated therefrom by means of prime (') notations.

The differential 150 is primarily adapted for lighter-duty applications than the differential 10. In contrast to differential 10, which incorporates four control gears in the central chamber with two drive gears in each side chamber, the differential 150 utilizes two control gears 152 and 154. The intermediate case section 46' is shaped accordingly to define a gear pump with two control gears 152 and 154. The control gear 152 is secured to the shaft 156 extending into one side chamber. A drive gear 158 is secured to the end of shaft 156 in meshed engagement with the internal gear 88' in the corresponding side chamber. Similarly, the control gear 154 is mounted on a shaft 160 which extends into the opposite side chamber. Another drive gear 162 is secured to the end of shaft 160 in meshed engagement with the other internal gear 88' in the other corresponding side chamber. As is best seen in FIG. 7, two control valves 113 are provided for communicating the side chamber and the central chamber at opposite points of intermesh between control gears 152 and 154. The shafts 156 and 160 are bored to provide passageways 166 and 168 for pressure equalization between the side chambers. Other than these differences, the differential 150 is substantially similar in construction and function to the differential 10 described hereinbefore.

From the foregoing, it will thus be apparent that the present invention comprises an improved differential having numerous advantages over the prior art. The present invention enables controlled application of power from the input shaft to the output shafts while controlling the relative amount of differentiation between the output shafts to provide greater control and safety. Other advantages will be evident to those skilled in the art.

Although particular embodiments of the invention have been illustrated in the accompanying Drawings and described in the foregoing Detailed Description, it will be understood that the invention is not limited only to the embodiments disclosed, but is intended to embrace any alternatives, equivalents, modifications and/or rearrangements of elements falling within the scope of the invention as defined by the following Claims.

What is claimed is:

1. A hydraulic-controlled differential, which comprises:

a case supported for rotation about a transverse axis, said case defining a central chamber and two opposite side chambers;
means for effecting rotation of said case;
a rotatable output shaft extending outwardly from each side chamber of said case along the transverse axis;
at least two control gears supported for rotation in the central chamber of said case, said control gears and the central chamber of said case defining a gear pump with adjacent gears being intermeshed for rotation in opposite directions;
means extending between the central chamber and the side chambers of said case for drivingly connecting said control gears with the respective output shaft;
the side chambers in said case being fluidly connected for fluid level and pressure equalization between the side chambers; and
control valve means connected between each side chamber and the central chamber of said case adjacent intermesh of said control gears for limiting maximum fluid flow rate between the chambers to effect hydraulic modulation during differential drive of said output shafts.

2. The differential of claim 1, wherein said means for effecting rotation of said case comprises:
a longitudinal input shaft;
a drive pinion secured to said input shaft for rotation therewith; and
a crown gear secured about said case in engagement with said drive pinion.

3. The differential of claim 1, wherein said means drivingly interconnecting said control gears and said output shafts comprises:
at least two rotatable shafts, said control gears being individually secured to said shafts for rotation therewith;
the control shaft supporting one control gear extending in sealed engagement into one of the side chambers and the other control shaft supporting the other control gear extending in sealed engagement into the other side chamber of said case;
two internal gears, one positioned in each side chamber of said case and secured to the respective output shaft for rotation therewith; and
at least two drive gears, one secured to the respective control shaft and engaged with the respective internal gear in each side chamber of said case.

4. The differential of claim 1, wherein said control valve means comprises:
a slideable valve member positioned in a bore extending between each side chamber of said case and the central chamber at the outside points of intermeshing engagement of each adjacent pair of control gears;
said valve member being movable between minimum open and maximum open positions; and
means for normally biasing each valve member toward the minimum open position.

5. The differential according to claim 4, wherein siad valve member includes an internal bore defining a predetermined flow rate in the minimum open position, and external grooves defining with the internal bore a predetermined relatively higher predetermined flow rate in the maximum open position.

6. The differential according to claim 4, wherein said biasing means comprises a compression spring.

7. A hydraulic-modulated differential, which comprises:
a case supported for rotation about a transverse axis, said case defining a central chamber and two opposite side chambers;
means for effecting rotation of said case;
a rotatable output shaft extending outwardly from each side chamber of said case along the transverse axis;
two pairs of control gears supported for rotation in the central chamber of said case, said control gears and the central chamber defining a gear pump with adjacent gears being intermeshed so that diagonally-opposite gears rotate in the same direction;
means extending between the central chamber and each side chamber of said case for drivingly connecting one diagonal pair of control gears with the respective output shaft;
the side chambers in said case being fluidly connected with a portion of the central chamber between said control gears for fluid level and presssure equalization between the side chambers; and
control valve means connected between each side chamber and the central chamber of said case adjacent intermesh of said control gears for limiting maximum fluid flow rate between the chambers to effect hydraulic modulation during differential drive of said output shafts.

8. The differential of claim 7, wherein said means drivingly interconnecting said control gears and said output shafts comprises:
two pairs of rotatable shafts, said control gears being individually secured to said shafts for rotation therewith;
the control shafts supporting one diagonally opposite pair of control gears extending in sealed engagement into one of the side chambers and the other control shaft supporting the other diagonally opposite pair of control gears extending in sealed engagement into the other side chamber of said case;
two internal gears, one positioned in each side chamber of said case and secured to the respective output shaft for rotation therewith; and
two pairs of drive gears, one pair secured to the respective control shafts and engaged with the respective internal gear in each side chamber of said case.

9. The differential of claim 7, wherein said control valve means comprises:
a slideable valve member positioned in a bore extending between each side chamber of said case and the central chamber at the outside points of intermeshing engagement of each adjacent pair of control gears;
said valve member being movable between minimum open and maximum open positions; and
means for normally biasing each valve member toward the minimum open position;
each valve member being internally and externally configured to permit a predetermined fluid flow rate in the minimum open position and a predetermined larger fluid flow rate in the maximum open position.

10. A hydraulic-modulated differential, which comprises:
a case supported for rotation about a transverse axis, said case defining a central chamber and two opposite side chambers;

means for effecting rotation of said case;

a rotatable output shaft extending outwardly from each side chamber of said case along the transverse axis;

two control gears supported for rotation in the central chamber of said case, said control gears and the central chamber defining a gear pump with adjacent gears being intermeshed for rotation in opposite directions;

means extending between the central chamber and side chambers of said case for drivingly connecting each control gear with the respective output shaft;

the side chambers in said case being fluidly connnected for fluid level and pressure equalization between the side chambers; and control valve means connected between each side chamber and the central chamber of said case adjacent the points of intermeshing engagement of said control gears for limiting maximum fluid flow rate between the chambers to effect hydraulic modulation during differential drive of said output shafts.

11. The differential of claim 10, wherein said means drivingly interconnecting said control gears and said output shafts comprises:

two rotatable shafts, said control gears being individually secured to said shafts for rotation therewith;

the control shafts supporting one control gear extending in sealed engagement into one of the side chambers and the other control shaft supporting the other control gear extending in sealed engagement into the other side chamber of said case;

two internal gears, one positioned in each side chamber of said case and secured to the respective output shaft for rotation therewith; and two drive gears, one secured to the respective control shaft and engaged with the respective internal gear in each side chamber of said case.

12. The differential of claim 10, wherein said control valve means comprises:

a slideable valve member positioned in a bore extending between each side chamber of said case and the central chamber at the outside points of intermeshing engagement of each adjacent pair of control gears;

said valve member being movable between minimum open and maximum open positions; and means for normally biasing each valve member toward the minimum open position;

each valve member being internally and externally configured to permit a predetermined flow rate in the minimum open position and a predetermined larger fluid flow rate in the maximum open position.

* * * * *